US007979553B2

(12) United States Patent
Fujita (10) Patent No.: US 7,979,553 B2
(45) Date of Patent: Jul. 12, 2011

(54) ELECTRONIC DEVICE AND CONTROL METHOD THEREFOR

(75) Inventor: Shunji Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 941 days.

(21) Appl. No.: 11/045,783

(22) Filed: Jan. 28, 2005

(65) Prior Publication Data

US 2005/0198357 A1 Sep. 8, 2005

(30) Foreign Application Priority Data

Jan. 30, 2004 (JP) ................................. 2004-024731

(51) Int. Cl.
G06F 15/16 (2006.01)
(52) U.S. Cl. ...................................... 709/227; 709/232
(58) Field of Classification Search ........... 709/220–222
See application file for complete search history.

(56) References Cited

U.S. PATENT DOCUMENTS

| 6,801,507 | B1 | 10/2004 | Humpleman et al. | |
|---|---|---|---|---|
| 2003/0069981 | A1* | 4/2003 | Trovato | 709/228 |
| 2005/0122934 | A1 | 6/2005 | Fujita | |
| 2005/0193127 | A1 | 9/2005 | Moore et al. | |
| 2005/0198344 | A1 | 9/2005 | Fujita | |
| 2005/0226209 | A1 | 10/2005 | Miyahara et al. | |
| 2006/0036733 | A1 | 2/2006 | Fujimoto et al. | |
| 2006/0104284 | A1* | 5/2006 | Chen | 370/395.3 |
| 2006/0184661 | A1 | 8/2006 | Weisman et al. | |
| 2006/0291434 | A1 | 12/2006 | Gu et al. | |
| 2007/0011280 | A1* | 1/2007 | Colvig et al. | 709/219 |
| 2008/0016255 | A1* | 1/2008 | Saint-Hilaire et al. | 710/11 |
| 2008/0091844 | A1 | 4/2008 | Park | |
| 2008/0215712 | A1 | 9/2008 | Ohara | |
| 2009/0219834 | A1 | 9/2009 | Babbar et al. | |
| 2009/0319695 | A1 | 12/2009 | Saint-Hilaire et al. | |
| 2009/0326684 | A1 | 12/2009 | Wang | |

FOREIGN PATENT DOCUMENTS

| JP | 10-327181 A | 12/1998 |
|---|---|---|
| JP | 2000-209235 A | 7/2000 |
| JP | 2002-237816 A | 8/2002 |
| WO | 03/084139 A | 10/2003 |

OTHER PUBLICATIONS

Contributing MEMBERS of the UPnP Form, "Universal Plug and Play Device Architecture", Version 1.0, Jun. 8, 2000, Microsoft Corporation. (52 pages).
R. Droms, "Dynamic Host Configuration Protocol", Request for Comments RFC 2131, Bucknell University, Mar. 1997. (45 pages).

(Continued)

*Primary Examiner* — Asad M Nawaz
(74) *Attorney, Agent, or Firm* — Cowan, Liebowitz & Latman, P.C.

(57) ABSTRACT

An electronic device connected to a network at a first network address set by AutoIP or the like detects the existence of an address server such as a DHCP server on such network. If the address server is detected, then it is determined whether or not the electronic device is transferring data to another device. If it is determined that the electronic device is transferring data, the device changes the first network address to a second network address acquired from the address server after the transfer of the data is finished.

11 Claims, 10 Drawing Sheets

OTHER PUBLICATIONS

Ryan Troll, "Automatically Choosing an IP Address in an Ad-Hoc IPv4 Network", published Mar. 2, 2000, by the Internet Engineering Task Force (IETF) via http://tools.ietf.org/id/draft-ietf-dhc-ipv4-autoconfig-05.txt (last accessed Jan. 16, 2009), (8 pages).

Japanese Office Action issued on Jan. 26, 2009 concerning the basic Japanese Patent Application No. 2004-024731, which is foreign counterpart to the instant application.

Microsoft, Automatic Windows 98/Me TCP/IP Addressing Without a DHCP Server, http:web.archive.org/web/20011007121617/http://supportnicrosoft.co... Jul. 6, 2001.

Droms, Automated Configuration of TCP/IP With DHCP, IEEE Xplore, Aug. 1999.

Akihiro, et al. Problems and solutions of DHCP Experiences with DHCP Implementation and Operation, Proc. INET 04/995.

The above reference was cited in a Apr. 28, 2009 US Office Action that issued in related U.S. Appl. No. 11/044,863.

The above references were cited in a Mar. 16, 2010 US Office Action that issued in related U.S. Appl. No. 11/044,863, which is enclosed.

The above reference was cited in a Dec. 9, 2010 US Notice of Allowance that issued in related U.S. Appl. No. 11/044,863.

* cited by examiner

```
NOTIFY * HTTP/1.1
HOST : 239.255.255.250:1900
CACHE-CONTROL : max-age=seconds untill advertisement expires
LOCATION : URL for UPnP description for root device
NT : search target
NTS : ssdp:alive
SERVER : OS/version UPnP/1.0 product/version
USN : advertisement UUID
```

```
NOTIFY * HTTP/1.1
HOST : 239.255.255.250:1900
NT : search target
NTS : ssdp:byebye
USN : advertisement UUID
```

ELECTRONIC DEVICE AND CONTROL METHOD THEREFOR

FIELD OF THE INVENTION

The present invention relates to an electronic device having a network interface.

BACKGROUND OF THE INVENTION

In recent years, network technologies for searching for a device that provides a predetermined service on a network have been developed. One such technology is the "UPnP" (Universal Plug and Play) provided by Microsoft Corp. of the Unite States. In UPnP, "service", "device" and "control point" are predefined. A "service" is a logical unit that provides a predetermined service, a "device" is a logical unit that has one or more services, and a "control point" is a logical unit that controls one or more services.

UPnP is composed of internet standard technologies (protocols) such as IP, TCP, UDP and HTTP., and provides for an auto step, from connection to network to when devices on the network detect and recognize each other, a step of actually controlling the devices and a step of issuing an event (see Universal Plug and Play device Architecture Version 1.0, Jun. 8, 2000 10:41 AM). Below, a description is given of UPnP addressing and discovery steps having relation with the present invention.

Addressing refers to the step of acquiring a network address, in other words an IP address, and is presumed to be carried out prior to subscribing to a network and interacting with other devices. UPnP defines two means for setting the IP address.

The first means involves acquiring the IP address from a DHCP (Dynamic Host Configuration Protocol) server (see RFC 2131 Dynamic Host Configuration Protocol. IETF request for comments). A brief description of DHCP is given below.

A UPnP device necessarily has a DHCP client capability, so that, when the device subscribes to a network, the first thing it does is check for the existence of a DHCP server (DHCP DISCOVER). Then, if a DHCP server exists inside the network, the UPnP device receives a response from the DHCP server (DHCP OFFER), makes an IP address request (DHCP REQUEST), and can acquire and use, within a certain period of time, a unique IP address inside the same network that the DHCP server generates (DHCP ACK). That certain period of time is a lease period of time, and where it is desired to continue to use the IP address, the device must submit a new request (DHCP REQUEST) to the DHCP server before the expiration of the lease time and receive new permission. Moreover, when the device separates from the network, where the IP address is no longer required, that IP address must be returned to the DHCP server.

The second means involves setting an IP address using AutoIP (see Automatically Choosing an IP Address in an Ad-Hoc IPv4 Network. IETF draft). A brief description of AutoIP is given below.

AutoIP refers to the ability of a device to itself generate and set a given IP address. The usable IP address range is limited to from 169.254.1.0 to 169.254.254.255, and where the device discovers that no DHCP server exists on the network, that device generates an arbitrary IP address within the foregoing address range, and sets the IP address after using ARP (Address Resolution Protocol) to confirm that there is no other device using the same IP address. Accordingly, addressing can be carried out even in networks in which a DHCP server does not exist.

In UPnP, in order to prevent an increase in network traffic due to ARP, of these two means the DHCP server allocation method is preferred. As a result, a UPnP device set by AutoIP must periodically check if a DHCP server exists on the network (DHCP DISCOVER). In UPnP, it is recommended that the frequency cycle of such check be at intervals of 5 minutes.

After setting the IP address in the addressing step, the UPnP device carries out discovery. Discovery is a step of automatically mutually recognizing all the other devices on the network. In discovery, broadly speaking, there are two messages that are defined. One message is an ALIVE message, announcing that the device is joining the network. The other message is a BYEBYE message, announcing that the device is leaving the network. By multicast transmission of these messages, each device on the network can mutually recognize the existence of all the other devices on the network. In addition, these two messages have a Notification type defined by GENA (General Event Notification Architecture) protocol, by which the devices to be notified can be set to one of four types: Route device, UUID, device type and service type.

Figure 9:
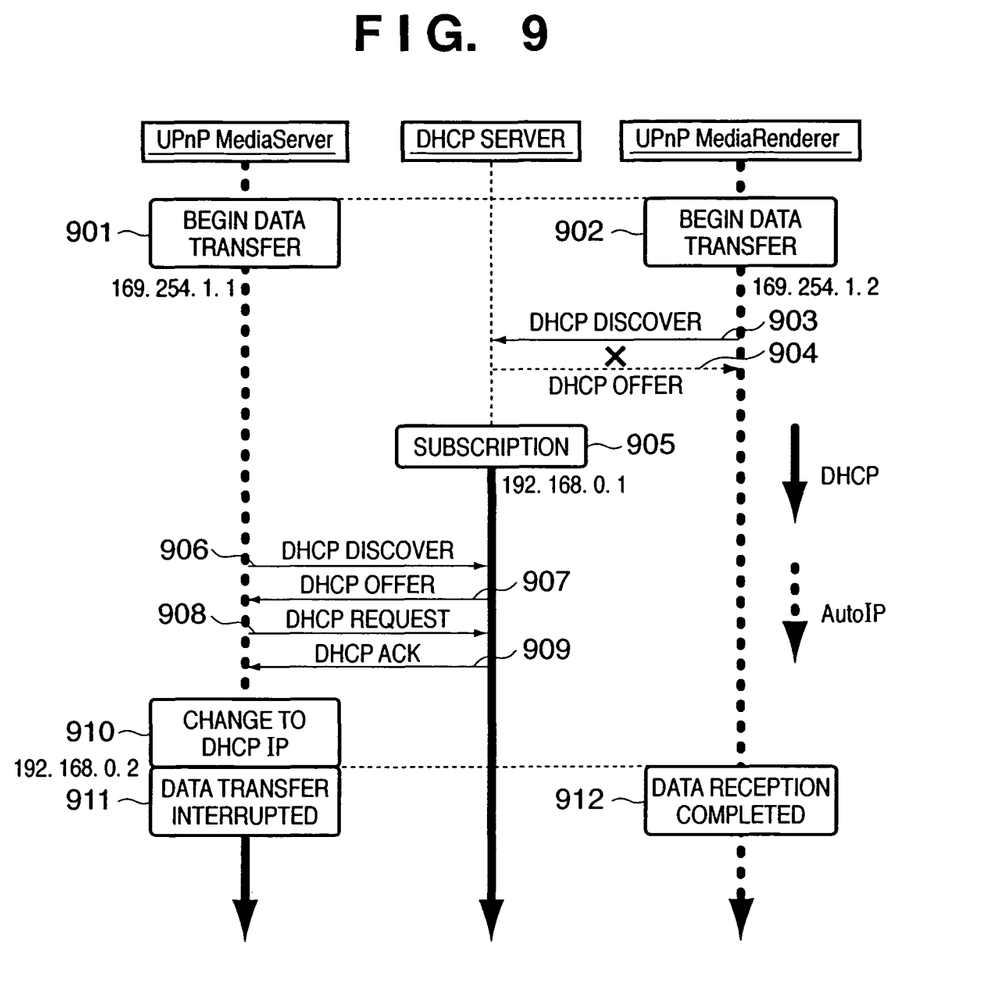
FIG. 9 is a diagram illustrating an ordinary shift of address as the DHCP server joins the network.

The UPnP device sets the IP address by the methods described in the foregoing addressing step. However, in a case where a DHCP server subscribes to a network consisting of a plurality of UPnP devices using AutoIP, a problem like that described below arises. FIG. 9 shows a sequence pertaining to the addressing step that is the problem, and a description thereof is provided according thereto.

The UPnP network is composed of MediaServer and MediaRenderer, in a state in which the devices have set IP addresses using AutoIP. It should be noted that the IP addresses are, respectively, 169.254.1.1 for MediaServer and 169.254.1.2 for MediaRenderer. In this initial state, it is assumed that there is no DHCP server present.

In a step 901, the MediaServer streams moving picture data, and in a step 902 the MediaRenderer receives the streamed data. In a step 903, the MediaRenderer periodically transmits a DHCP DISCOVER message and searches for a DHCP server. However, because the timing of the message transmission indicated in step 903 indicates that a DHCP server does not exist on the network, the MediaRenderer therefore does not receive a DHCP OFFER message (step 904). Next, in a step 905, by user operation, for example, a DHCP server subscribes to the network. At this time the DHCP server allocates to itself the IP address 192.168.0.1.

Next, in a step 906, the MediaServer periodically transmits the DHCP DISCOVER message and searches for a DHCP server. This time, a DHCP server does exist on the network. The DHCP server receives the DHCP DISCOVER message, and in a step 907 transmits a DHCP OFFER message describing an IP address it can provide. Here, the IP address that can be provided is 192.168.0.2. Next, in a step 908, the MediaServer acknowledges that a DHCP server exists within the network and transmits a DHCP REQUEST requesting permission to use the IP address 192.168.0.2. In a step 909, the DHCP server transmits a DHCP ACK message, permitting the MediaServer to use the IP address 192.168.0.2. Accordingly, in a step 910, the MediaServer switches from the IP address set by AutoIP to the IP address allocated by the DHCP server. However, the MediaServer and the MediaRenderer now have different network addresses, and in a step 911 and a step 912, streaming between the MediaServer and the MediaRenderer is interrupted.

SUMMARY OF THE INVENTION

An object of the present invention is to overcome the above-described drawbacks.

Another object of the present invention, for example, is to reduce the possibility of interruption of data transfer to other devices where the network address is set by AutoIP or the like and an address server such as a DHCP server subscribes to the network.

In an aspect of the present invention, there is provided an electronic device connectible to a network, the device comprising: detection means for, if the electronic device is connected to a network at a first network address that the electronic device sets itself, detecting an address server on the network; and determination means for, if an address server is detected, determining whether or not the electronic device is transferring data to another device, wherein if it is determined by the determination means that the electronic device is transferring data to another device, the device changes the first network address to a second network address acquired from the address server after the transfer of the data is finished.

Another aspect of the present invention there is provided a control method for an electronic device connectible to a network, the method comprising: a detection step of, if the electronic device is connected to a network at a first network address that the electronic device sets itself, detecting an address server on the network; a determination step of, if an address server is detected, determining whether or not the electronic device is transferring data to another device; and a changing step of, if it is determined in the determination step that the electronic device is transferring data to another device, changing the first network address to a second network address acquired from the address server after the transfer of the data is finished.

Other features, objects and advantages of the present invention is apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments of the present invention will now be described in detail in accordance with the accompanying drawings.

First Embodiment

Figure 1:
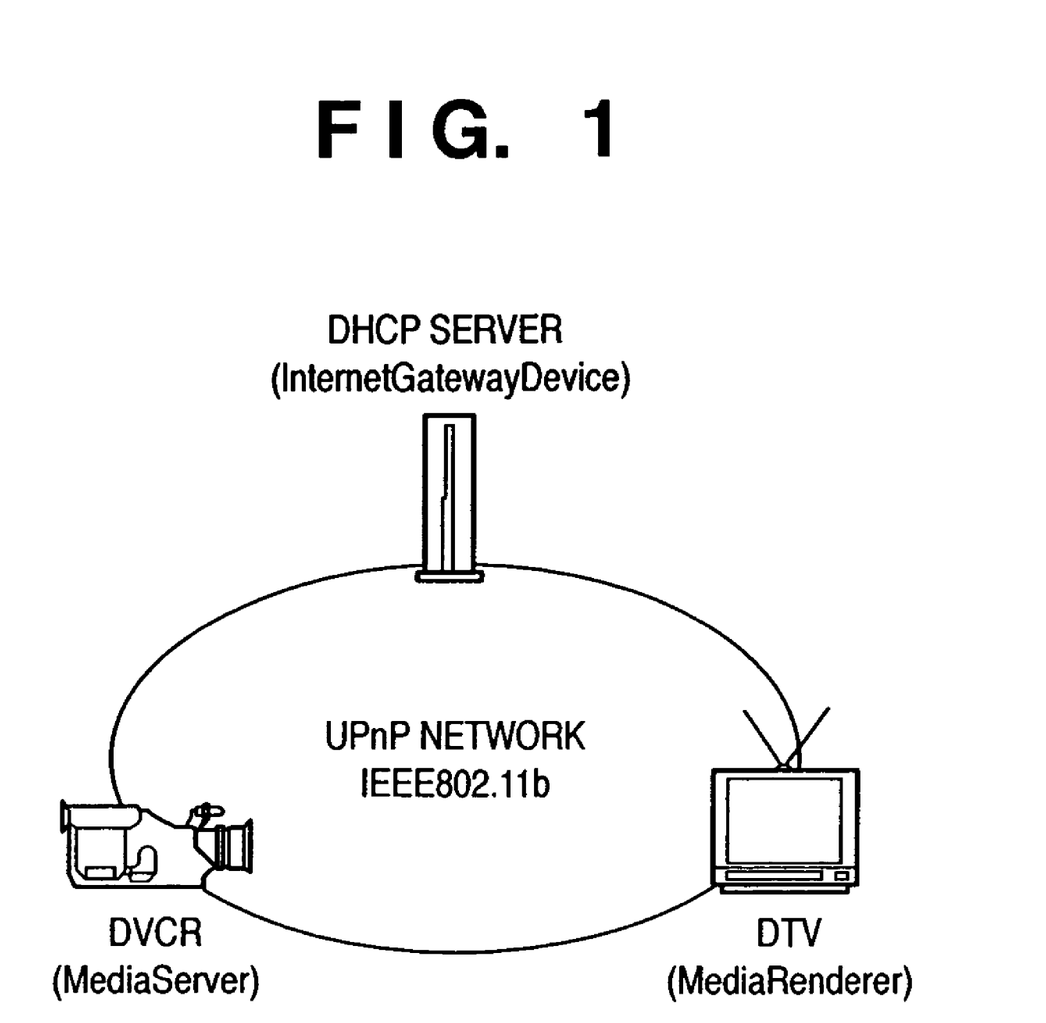
FIG. 1 is a diagram showing a UPnP network according to an embodiment of the present invention.

FIG. 1 is a diagram showing the configuration of a network (a UPnP network) configured according to UPnP protocol. In the present embodiment (as with other embodiments), the description proceeds using a digital video camera (DVCR) and a digital television (DTV) as examples of an electronic device connectable to a network. Alternatively, however, other electronic devices may be used. The DVCR of the present embodiment is MediaServer standardized by the UPnP Audio Video Working Committee (hereinafter "AV WC"), the DTV is MediaRenderer standardized by the same AV WC, and the DHCP server as the address server is the Internet Gateway device ("IGD") standardized by the Internet Gateway WC. The DTV is provided with a UPnP control point capability. In the present embodiment, all devices are connected by wireless interfaces conforming to IEEE802.11b standard. However, as can be understood by those of ordinary skill in the art, the present invention can also be adapted to a network configured using specifications other than the IEEE802.11b standard, such as IEEE802.11a, IEEE802.11g, Ethernet (registered trademark), IEEE1394 and UltraWideBand.

It should be noted that although in the present embodiment the present invention is adapted to a DVCR, the present invention can also be implemented with devices other than a DVCR, such as, for example, a digital camera, a mobile telephone, a portable computer, and so forth.

Figure 10:
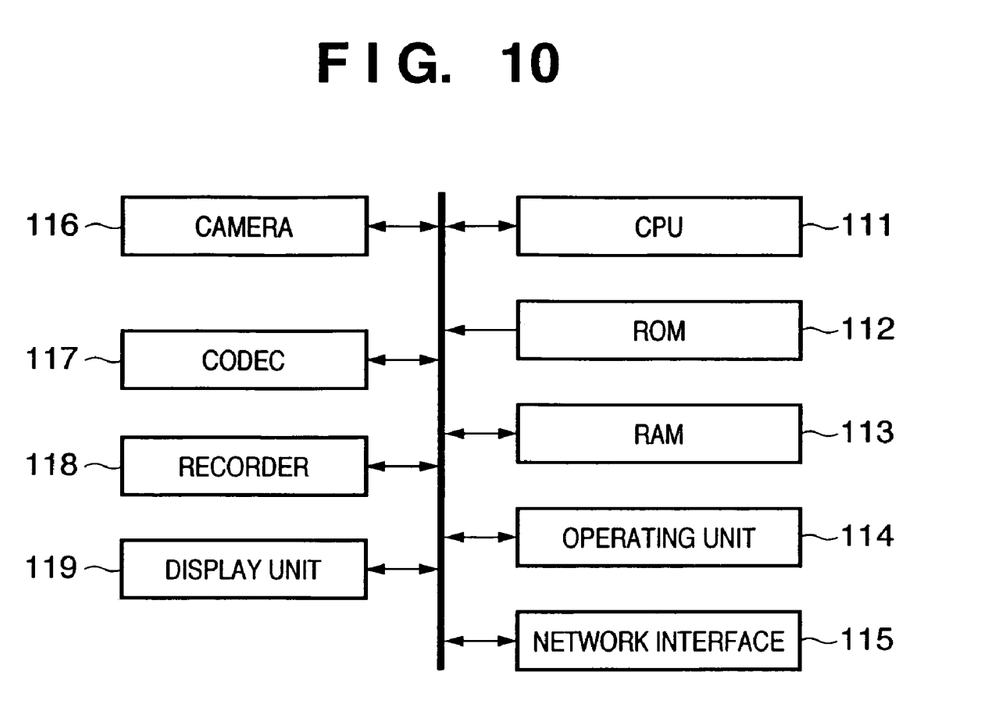
FIG. 10 is a block diagram of the DVCR according to one embodiment of the present invention.

FIG. 10 is a block diagram showing the main constituent elements of the DVCR in the present embodiment. The DVCR comprises a CPU 111 that controls the device as a whole, and is further comprised of the components described below.

Reference numeral 112 designates a ROM storing a control program, a UUID of DVCR 4, a device description and a service description, 113 designates a RAM used as a work area, and 114 designates an operating unit having various switches and buttons, including a recording button as well as a network subscription button that switches between subscription to a UPnP network and separation from a UPnP network. In addition, reference numeral 115 designates a network interface for connecting to a UPnP network, 116 designates a camera unit comprising an optical lens and an image sensor (such as a CCD sensor), 117 designates a codec unit for compressing and decompressing data, 118 designates a recorder for recording/reproducing image data to and from a storage medium (such as a disk medium, magnetic tape, etc.) and 119 designates a display unit having a liquid crystal display (LCD) or the like.

In a configuration like that described above, when power to the DVCR is turned on and the network subscription button is pressed, an IP address request (DHCP REQUEST) is issued to the DHCP server 100 and subscription to a network is carried out. Then, in accordance with instructions from a control point on the UPnP network (in the present embodiment, a DTV), a moving picture stream with audio recorded on a storage medium is transmitted to a MediaRenderer on the network (in the present embodiment also the DTV), where it is reproduced.

Figure 2:
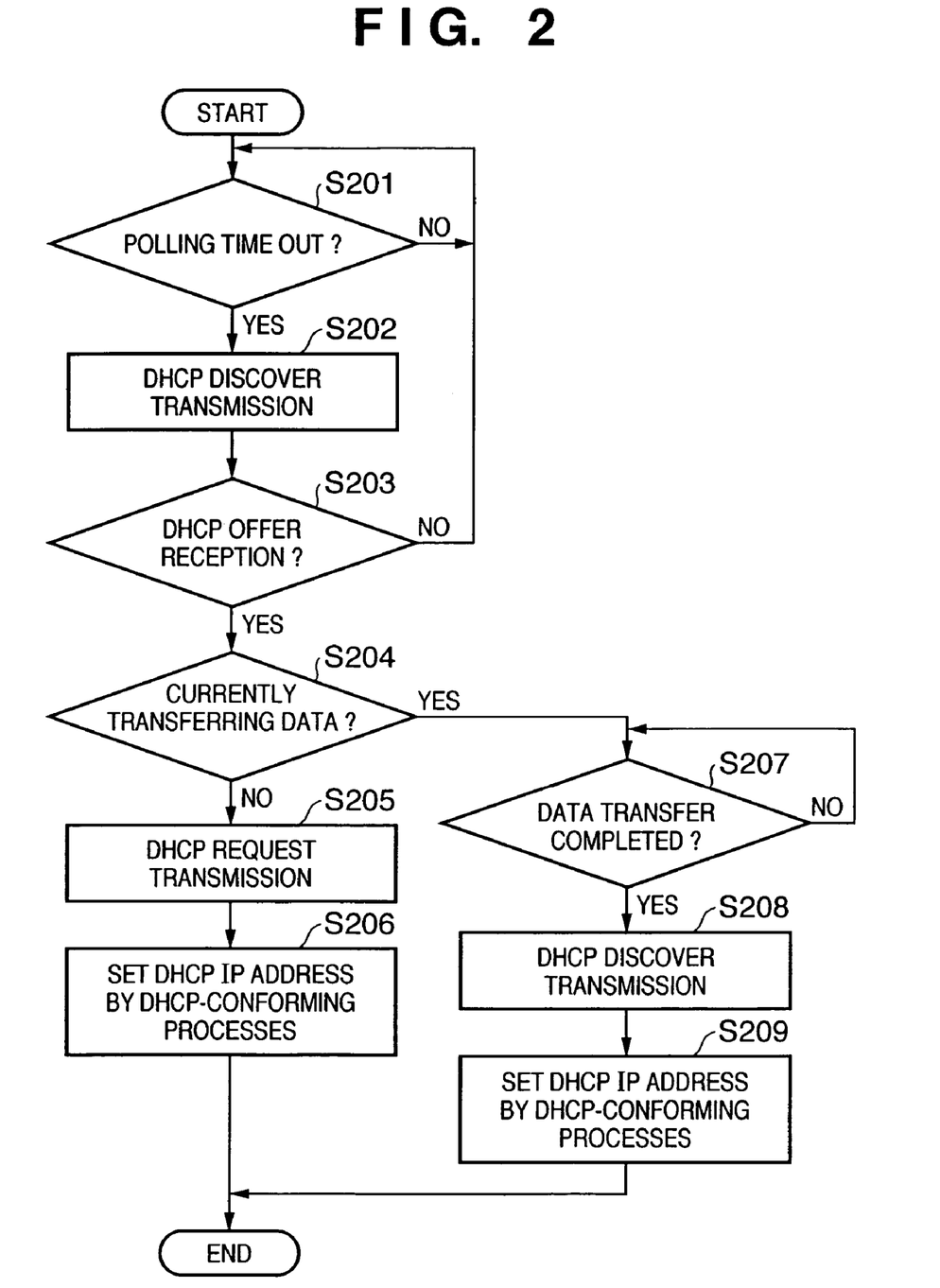
FIG. 2 is a flow chart showing a process according to a first embodiment of the present invention, carried out during a DHCP server search and when the DHCP server joins a network, in a device using AutoIP.

Next, following FIG. 2, a description is given of a process carried out in a DVCR which subscribes to a network using AutoIP when the DHCP server subscribes to the network. It should be noted that each UPnP device, when the AutoIP setting is in effect, transmits a DHCP DISCOVER message every 5 minutes and periodically conducts searches.

In a step S201, when it comes time for the DVCR to conduct its 5-minute search, broadcasts a DHCP DISCOVER message in a step S202. In a step S203, if the DVCR does not receive a DHCP OFFER message from the DHCP server, the AutoIP setting is maintained, with the DHCP search again repeated when 5 more minutes pass.

By contrast, if in step S203 the DVCR receives a DHCP OFFER message from the DHCP server, in a step S204 the DVCR itself checks the connection status. If the DVCR is not connected to another device on the network, in other words if the DVCR is not transmitting data to or receiving data from another device, then in a step S205 the DVCR transmits a DHCP REQUEST message requesting permission to use the IP address described in the DHCP OFFER message. Thereafter, the usual DHCP-conforming address allocation is carried out, and setting of the IP address allocated from the DHCP server is completed by reception of a DHCP ACK message (step S206).

If in step S204 it is determined from the results of the connection status investigation that the DVCR is connected to another device on the network, in other words that the DVCR is transmitting data to or receiving data from another device, then processing proceeds to a step S207 and the termination of such data transmission or reception is awaited. When the connection is cut, that is, when data transmission or reception ends, processing proceeds from step S207 to a step S208 and the DHCP DISCOVER message is again transmitted. Thereafter, the DHCP-conforming processes, that is, DHCP OFFER reception, DHCP REQUEST transmission and DHCP ACK reception, are carried out, thus, setting of the IP address allocated from the DHCP server is carried out (step S209).

Figure 3:
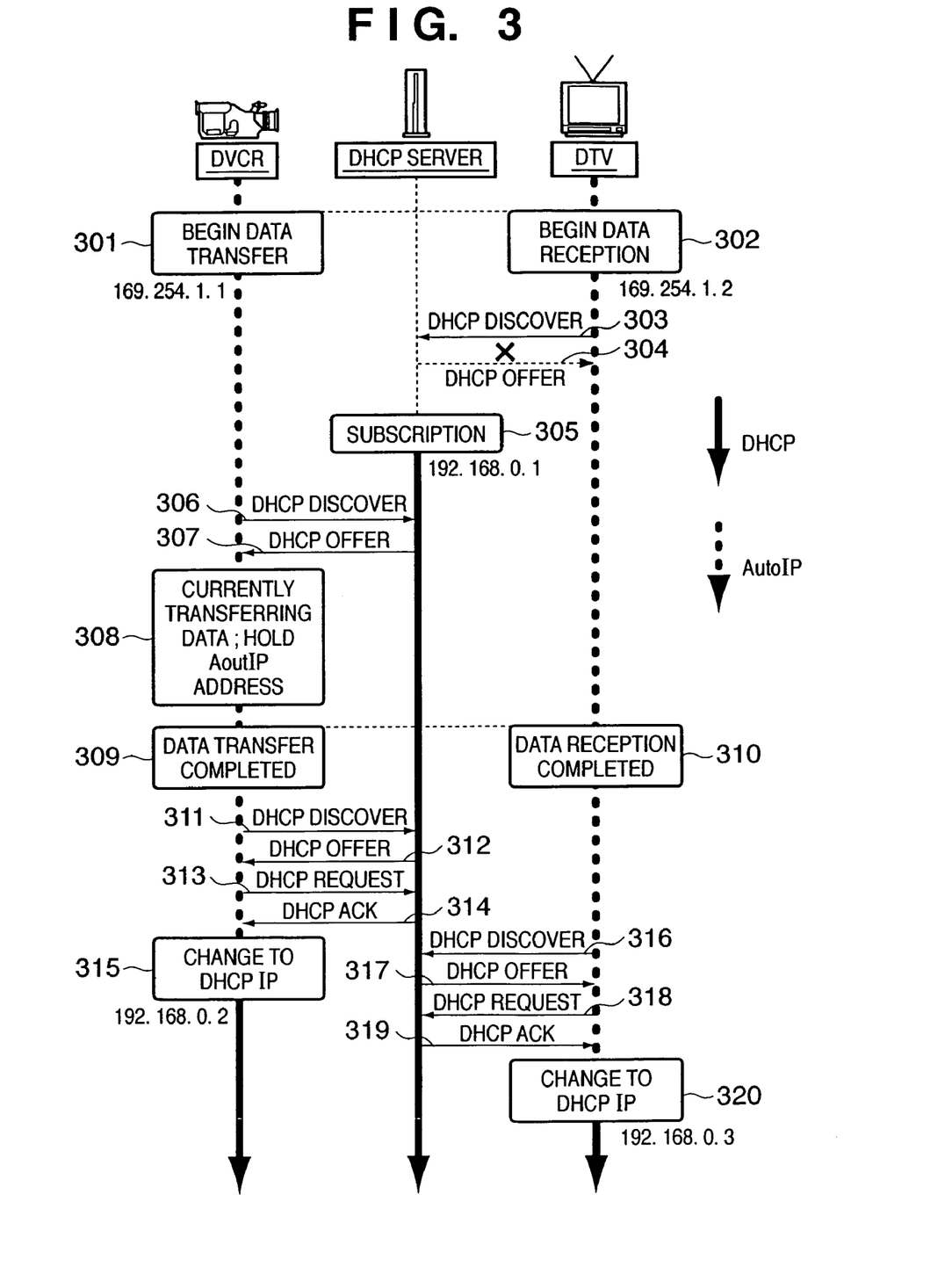
FIG. 3 is a diagram illustrating a transition of address of a digital video camera (DVCR) according to the first embodiment.

Next, an example of operation executed by a DVCR which performs the process shown in FIG. 2, in a case in which the DHCP server participates in a network configured by AutoIP, will be discussed using FIG. 3.

In an initial state, the DVCR and the DTV set their IP addresses by AutoIP, with the DVCR address being 169.254.1.1 and the DTV address being 169.254.1.2. In addition, in the present embodiment, the polling cycle for searching for the DHCP server when the IP address setting is in effect is 5 minutes. However, it should be noted that the 5-minute interval is merely illustrative, and the present invention is not limited to such a cycle. In such an initial state, a description is given of the steps shown in FIG. 3.

Using a control point application on the DTV, the user selects the DVCR from among the UPnP devices on the network as the data transmission source. Next, the user selects the video data in the DVCR and presses the play button, whereupon the DTV transmits a RTSP SETUP command to the DVCR, establishes a connection between the DTV and the DVCR, and transmits a RTSP PLAY command and begins RTP/RTSP streaming. When the DVCR receives the RTSP PLAY command, it begins transmitting the specified video data by RTP. The DTV receives the moving picture data transmitted from the DVCR and displays it in real time on a display screen (steps 301, 302).

In a step 303, because the cycle for searching for the DHCP server has elapsed, the DTV broadcasts a DHCP DISCOVER message. In a step 304, because no DHCP server exists on the network, the DTV does not receive a DHCP OFFER message, and as a result maintains the AutoIP setting. Next, in a step 305, the DHCP server is, for example, connected manually by the user to the network. At this time the DHCP server is given the IP address 192.168.0.1 allocated to itself.

In a step 306, because the cycle for searching for the DHCP server has elapsed, the DVCR broadcasts a DHCP DISCOVER message. In a step 307, the DVCR receives a DHCP OFFER message from the DHCP server. Included in the DHCP OFFER message is an IP address that can be provided, which, in this embodiment, is 192.168.0.2. In a step 308, the DVCR, despite having confirmed the existence of the DHCP server on the network, does not carry out a DHCP REQUEST but instead maintains the AutoIP address setting because currently the DVCR is transmitting data to the DTV (steps S204, S207).

Thereafter, when the user is finished viewing the video data, the user pressed the stop button on the control point application, whereupon the DTV transmits a RTSP TEARDOWN command to the DVCR and the DVCR, having received the command, ends data transmission and cuts the connection with the DTV (steps 309, 310). In a step 311, when the DVCR terminates data transmission it immediately broadcasts a DHCP DISCOVER message and again searches for the DHCP server. In a step 312, the DVCR receives the DHCP OFFER message from the DHCP server. As described with respect to step 307, included in the DHCP OFFER message is an IP address that can be provided, which is again 192.168.0.2. It should be noted that this IP address is merely illustrative, and need not be the same every time. In a step 313, the DVCR, because it is not connected to any other device, transmits a DHCP REQUEST to the DHCP server, requesting permission to use the IP address 192.168.0.2. In a step 314, the DVCR receives a DHCP ACK message from the DHCP server. In a step 315, the DVCR changes from the AutoIP address (168.254.1.1) to the IP address allocated from the DHCP server (192.168.0.2) (steps S208, S209).

Then, because the cycle for searching for the DHCP server has elapsed for the DTV as well, the DTV, in a step 316, broadcasts a DHCP DISCOVER message and searches for the DHCP server. In a step 317, the DTV receives a DHCP OFFER message from the DHCP server. The providable IP address included in this DHCP OFFER message is 192.168.0.3. In a step 318, the DTV transmits a DHCP REQUEST message to the DHCP server requesting permission to use the IP address 192.168.0.3. In a step 319, the DTV receives a DHCP ACK message from the DHCP server, and in a step 320 changes from the AutoIP address (168.254.1.2) to the IP address 192.168.0.3 allocated by the DHCP server (steps S201-S206). It should be noted that, in the foregoing description, whether or not there is a connection established is determined based on a period from the reception of the RSTP SETUP packet to the reception of the RSTP TEARDOWN packet. However, the present invention is not limited to such, and the foregoing arrangement is merely illustrative. For example, alternatively, the state of established connection, in other words, a data transmission state, may be determined based on a period from reception of a TCP SYN message to reception of a TCP FIN message.

Second Embodiment

Figure 4:
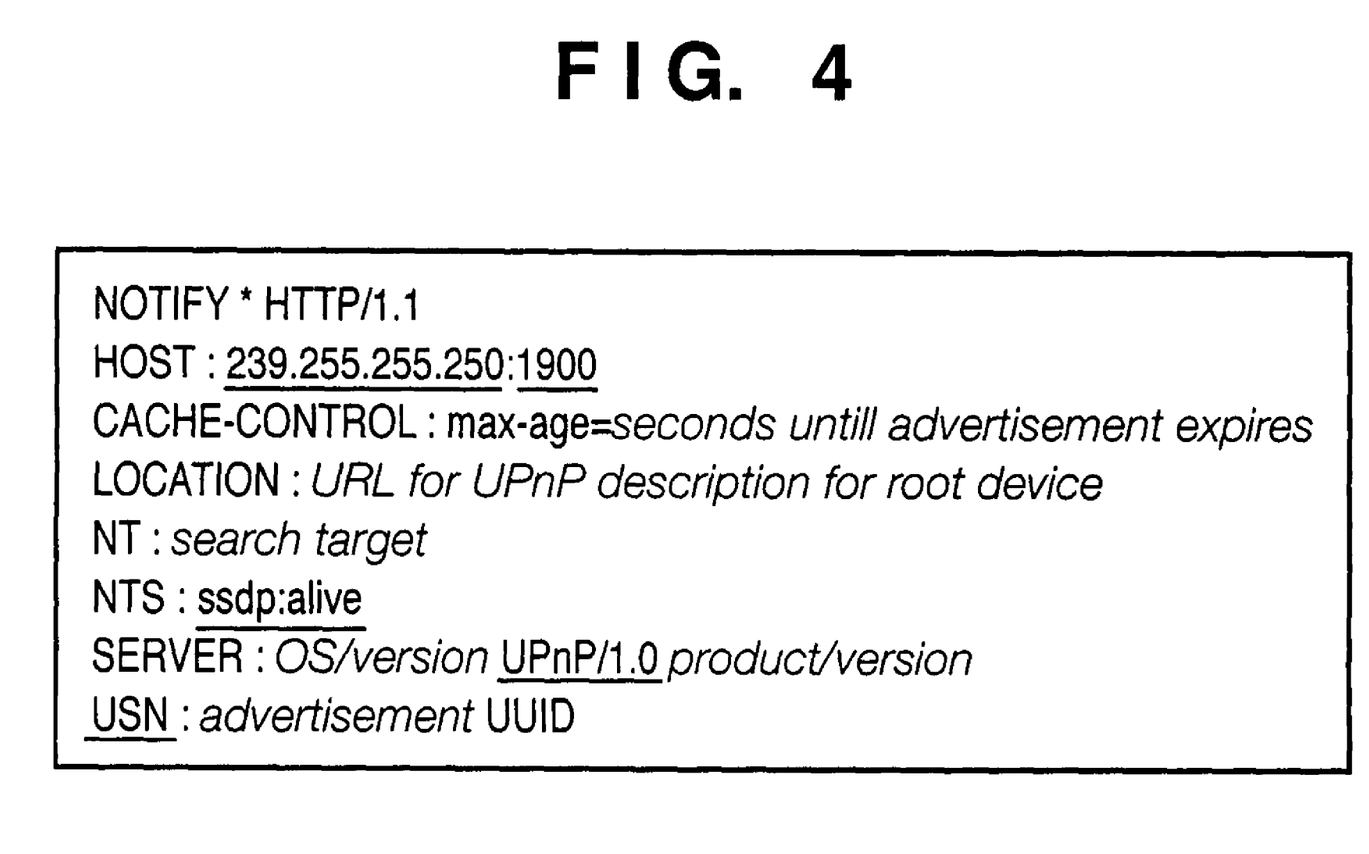
FIG. 4 is a diagram showing a UPnP ALIVE message in a second embodiment of the present invention.

A second embodiment of the present invention will now be described, with reference to an arrangement in which a check of whether or not a DHCP server exists on the network, that is, broadcast transmission timing of a DHCP DISCOVER message, is added to the DVCR of the first embodiment described above. In the second embodiment, in addition to polling at 5-minute intervals, a timing "when in the process of data transfer and the transfer is interrupted" and a timing "when an ALIVE message is received from an Internet Gateway Device (hereinafter "IGD")" are added as timing of transmitting a DHCP DISCOVER message. FIG. 4 shows an ALIVE message from an IGD. When a UPnP device multicasts an ALIVE message, the recipient can be set in the NT (Notification Type) header thereof.

Figure 5:
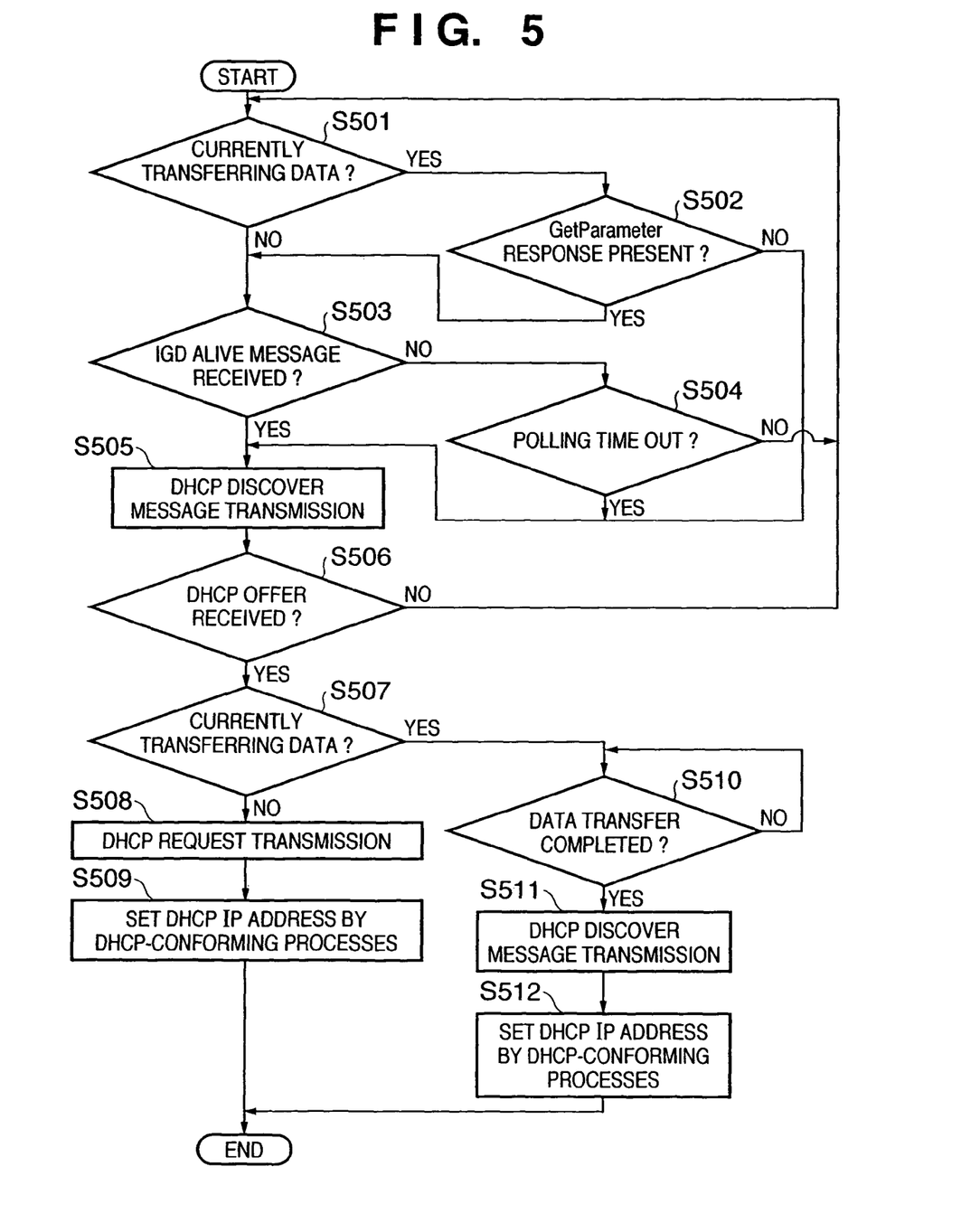
FIG. 5 is a flow chart showing a process according to the second embodiment of the present invention, carried out during a DHCP server search and when the DHCP server joins a network, in a device using AutoIP.

In accordance with FIG. 5, a description will now be given of a process carried out when a DVCR using AutoIP queries whether or not a DHCP server is on the network and a DHCP server is found to be on the network. As described above with respect to the first embodiment, each UPnP device, when set to AutoIP, the DVCR periodically searches for the DHCP server by transmitting a DHCP DISCOVER message every 5 minutes. In a step S501, if the DVCR is in a state of establishing connection to another device, that is, if the DVCR is transferring data, processing proceeds to a step S502. In step S502, in order to determine whether or not the data transfer is proceeding normally, a check is made to determine whether or not there is a response from the transfer counterparty during data transfer. In the second embodiment, a RTSP GetParameter command is periodically transmitted to the counterparty and a determination is made that data transfer is proceeding normally or not depending on the presence or absence of a response therefrom.

In step S502, if there is no response to the RTSP GetParameter command, in other words if data transmission is interrupted and the connection broken, then in a step S505 the DVCR broadcasts a DHCP DISCOVER message. This operation is a process premised on the possibility that the data transfer counterparty has detected the appearance of the DHCP server before the DVCR has done so, and has switched IP address from AutoIP to the IP address supplied by the DHCP server and severed the connection. It should be noted that the determination of the presence or absence of a response packet to the RTSP GetParameter command is made by determining whether or not such a response packet has been received with a predetermined period of time since the transmission of the command. However, alternatively, a TCP retransmit control may be included in the predetermined period of time.

In step S501, if the DVCR is in a state in which it is not connected to another device, in other words is not transferring data, or if in step S502 the DVCR has received a response to the RTSP GetParameter command, then processing proceeds to a step S503. In step S503, a process of determining whether or not to broadcast a DHCP DISCOVER message is carried out based on whether or not an ALIVE message has been received from the IGD. This operation is a process premised on the possibility that an IGD with DHCP server capabilities has subscribed to the network and transmitted an initial ALIVE message. Even if no ALIVE message from the IGD is received in step S503, when the 5-minute polling cycle for searching for the DHCP server elapses in a step S504, the DVCR broadcasts a DHCP DISCOVER message in the step S505. Thus, the DVCR of the second embodiment executes a DHCP server search depending on the three types of conditions of step S502, S503 and S504.

Next, in a step S506, it is determined whether or not a DHCP OFFER message from the DHCP server in response to the DHCP DISCOVER message issued in step S505 has been received. If a DHCP OFFER message has not been received, then processing returns to step S501, where the AutoIP is maintained. However, if in step S506 a DHCP OFFER message from the DHCP server has been received, then processing proceeds to a step S507, where the DVCR checks its own state of connection. Processing from step S507 on is the same as with the first embodiment described above (that is, steps S204-S209 in FIG. 2). Where the DVCR is not connected to another device on the network, in other words, where the DVCR is neither transmitting nor receiving data, then in a step S508 the DVCR transmits a DHCP REQUEST message requesting permission to use the IP address proffered by the DHCP OFFER message. Thereafter, the usual DHCP-conforming processes is carried out and the IP address allocated from the DHCP server is set by reception of a DHCP ACK message (step S509).

In step S507, if it is determined that the DVCR is in a state of connection with another device on the network, that is, if the DVCR is transmitting or receiving data, then processing proceeds to a step S510, where the end of data transmission or reception is awaited. In step S510, if the connection is cut, in other words if data transmission or reception is finished, then in a step S511 the DVCR once again transmits a DHCP DISCOVER message. Thereafter, the usual DHCP-conforming processes is carried out and the IP address allocated from the DHCP server is set by reception of the DHCP OFFER message, transmission of the DHCP REQUEST message and reception of the DHCP ACK message (step S512).

Figure 6:
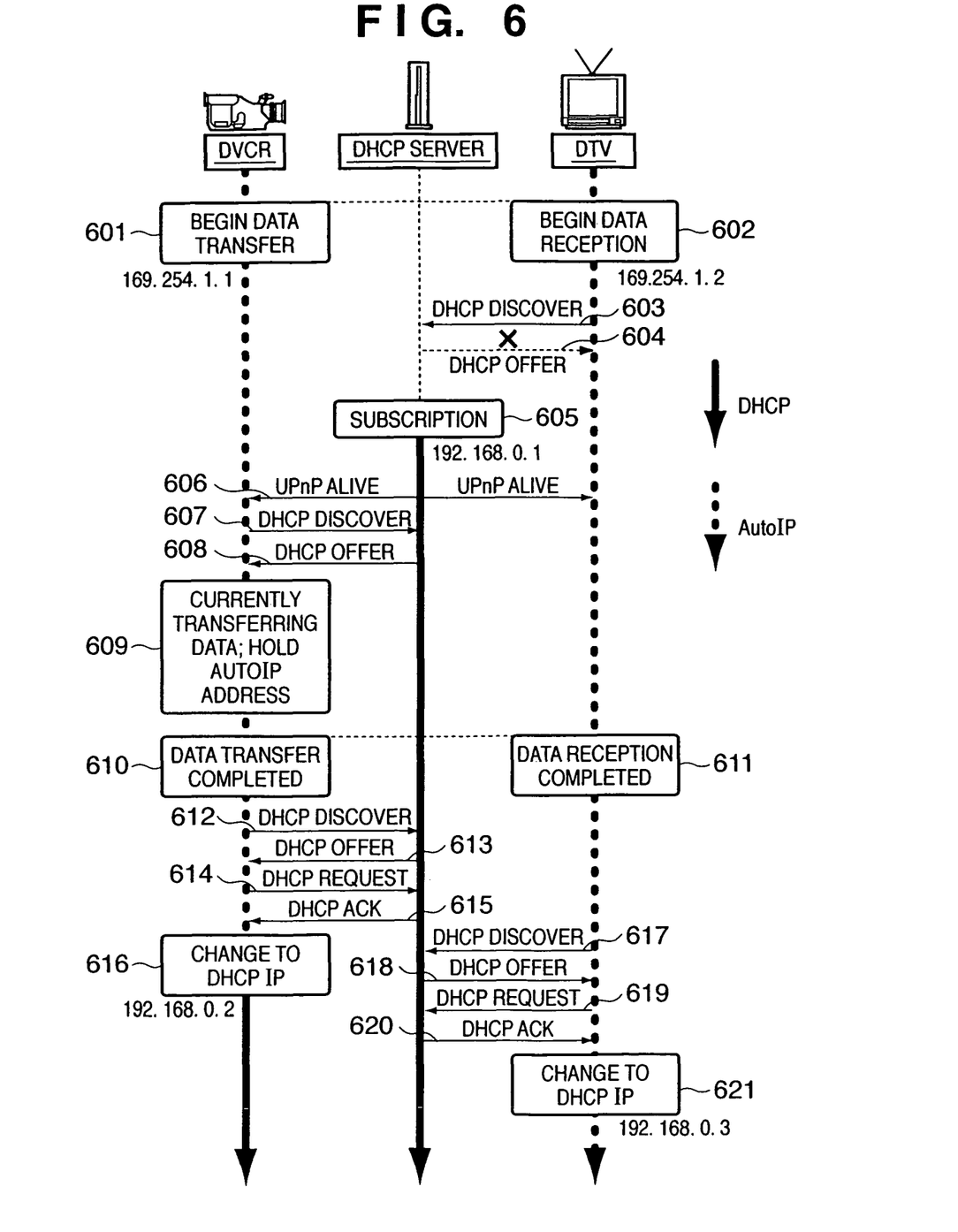
FIG. 6 is a diagram illustrating a transition of address of a digital video camera (DVCR) according to the second embodiment.

Next, an example of operation performed by a DVCR which executes the process shown in FIG. 5 in a case in which an IGD having the capabilities of a DHCP server participates in a network configured by AutoIP, will be discussed using FIG. 6.

In an initial state, the DVCR and the DTV set their IP addresses by AutoIP, with the DVCR address being 169.254.1.1 and the DTV address being 169.254.1.2. In addition, in the present embodiment, when AutoIP setting is in effect, the polling cycle for searching for the DHCP server is 5 minutes. However, it should be noted that the 5-minute interval is merely illustrative, and the present invention is not limited to such a cycle. In such an initial state, a description is given of the steps shown in FIG. 6.

Using a control point application on the DTV, the user selects the DVCR from among the UPnP devices on the network as the data transmission source. Next, the user selects the video data in the DVCR and presses the play button, whereupon the DTV transmits a RTSP SETUP command to the DVCR, establishes a connection between the DTV and the DVCR, and transmits a RTSP PLAY command and begins RTP/RTSP streaming. When the DVCR receives the RTSP PLAY command, it begins transmitting the specified video data by RTP. The DTV receives the moving picture data transmitted from the DVCR and displays it in real time on a display screen (steps 601, 602).

In a step 603, because the cycle for searching for the DHCP server has elapsed, the DTV broadcasts a DHCP DISCOVER message. In a step 604, because no DHCP server exists on the network, the DTV does not receive a DHCP OFFER message, and as a result maintains the AutoIP setting. Next, in a step 605, the DHCP server (IGD) is, for example, connected by the user to the network. At this time the DHCP server is given the IP address 192.168.0.1 allocated to itself.

In a step 606, when the IGD subscribes to the network it immediately multicasts an ALIVE message. Included in this ALIVE message is information in the NT header identifying the IGD. In a step 607, the DVCR, having received the ALIVE message from the IGD, broadcasts a DHCP DISCOVER message (steps S503, S505). Then, in a step 608, the DVCR receives a DHCP OFFER message from the DHCP server. Included in the DHCP OFFER message is an IP address that can be provided, which in this embodiment is 192.168.0.2. In a step 609, the DVCR, despite having confirmed the existence of the DHCP server on the network, does not carry out a DHCP REQUEST but instead maintains the AutoIP address setting because currently the DVCR is transmitting data to the TV (steps S506, S507 and S510).

Thereafter, when the user is finished viewing the video data, the user presses the stop button on the control point application, whereupon the DTV transmits a RTSP TEARDOWN command to the DVCR, and the DVCR, having received the command, ends data transmission and cuts the connection with the DTV (steps 610, 611). In a step 612, when the DVCR terminates data transmission it immediately broadcasts a DHCP DISCOVER message and again searches for the DHCP server (step S511). Then, in a step 613, the DVCR receives the DHCP OFFER message from the DHCP server. As described with respect to step 608, included in the DHCP OFFER message is an IP address that can be provided, which is again 192.168.0.2. It should be noted that this IP address is merely illustrative, and need not be the same every time. In a step 614, the DVCR, because it is not connected to any other device, transmits a DHCP REQUEST to the DHCP server, requesting permission to use the IP address 192.168.0.2. In a step 615, the DVCR receives a DHCP ACK message from the DHCP server. In a step 616, the DVCR changes from the AutoIP address (168.254.1.1) to the IP address allocated from the DHCP server (192.168.0.2) (step S512).

Then, because the cycle for searching for the DHCP server has elapsed for the DTV as well, the DTV, in a step 617, broadcasts a DHCP DISCOVER message and searches for the DHCP server. In a step 618, the DTV receives a DHCP OFFER message from the DHCP server. The providable IP address included in this DHCP OFFER message is 192.168.0.3. In a step 619, the DTV transmits a DHCP REQUEST message to the DHCP server requesting permission to use the IP address 192.168.0.3. In a step 620, the DTV receives a DHCP ACK message from the DHCP server, and in a step 621 changes from the AutoIP address (168.254.1.2) to the IP address 192.168.0.3 allocated by the DHCP server (steps S201-S206).

Third Embodiment

Figure 7:
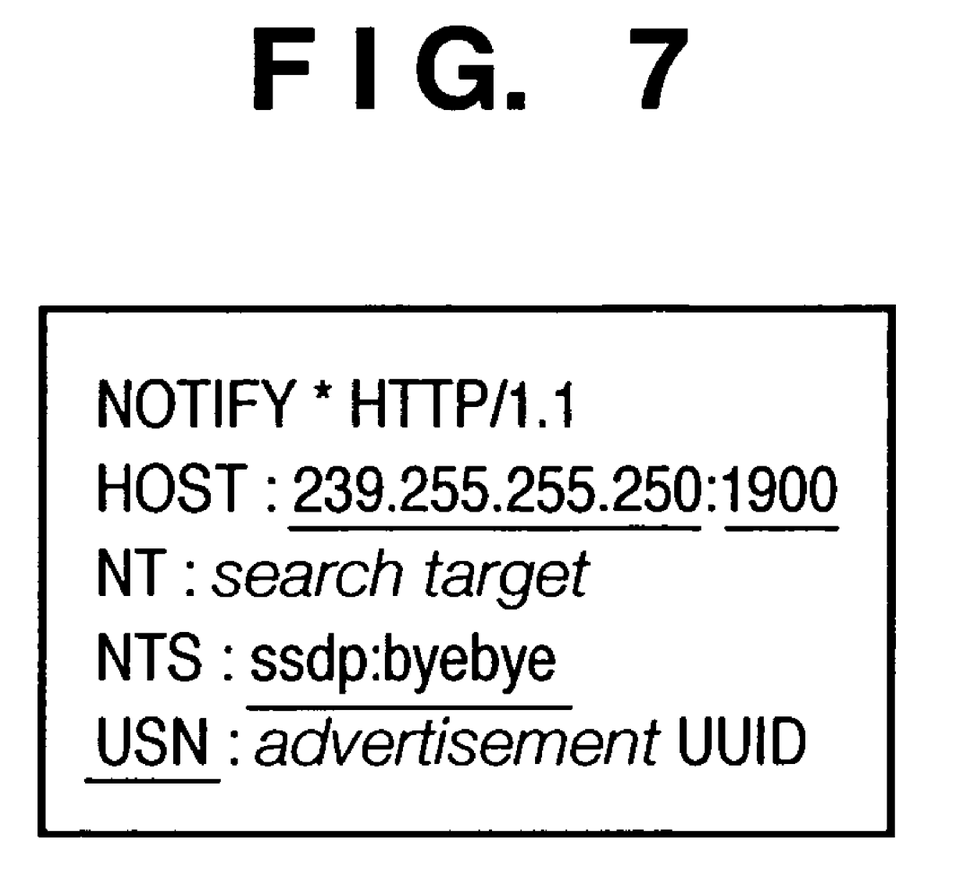
FIG. 7 is a diagram showing a UPnP BYEBYE message in a third embodiment of the present invention.

In a third embodiment of the present invention is described with reference to an arrangement in which, as the second embodiment, a timing of check of whether or not a DHCP server exists on the network, that is, a DHCP DISCOVER message broadcast transmission timing, is added to the DVCR of the first embodiment described above. The additional timings are different from those of the second embodiment. In the third embodiment, in addition to cyclical polling every 5 minutes, broadcast of the DHCP DISCOVER message also takes place when data transfer is interrupted during data transfer and when a BYEBYE message is received. The BYEBYE message is that described in the "Background of the Invention" section of the present specification, a sample packet of which is shown in FIG. 7. As with the ALIVE message, the UPnP device can set the recipient of the message in the NT (Notification Type) header when multicasting the BYEBYE message.

Figure 8:
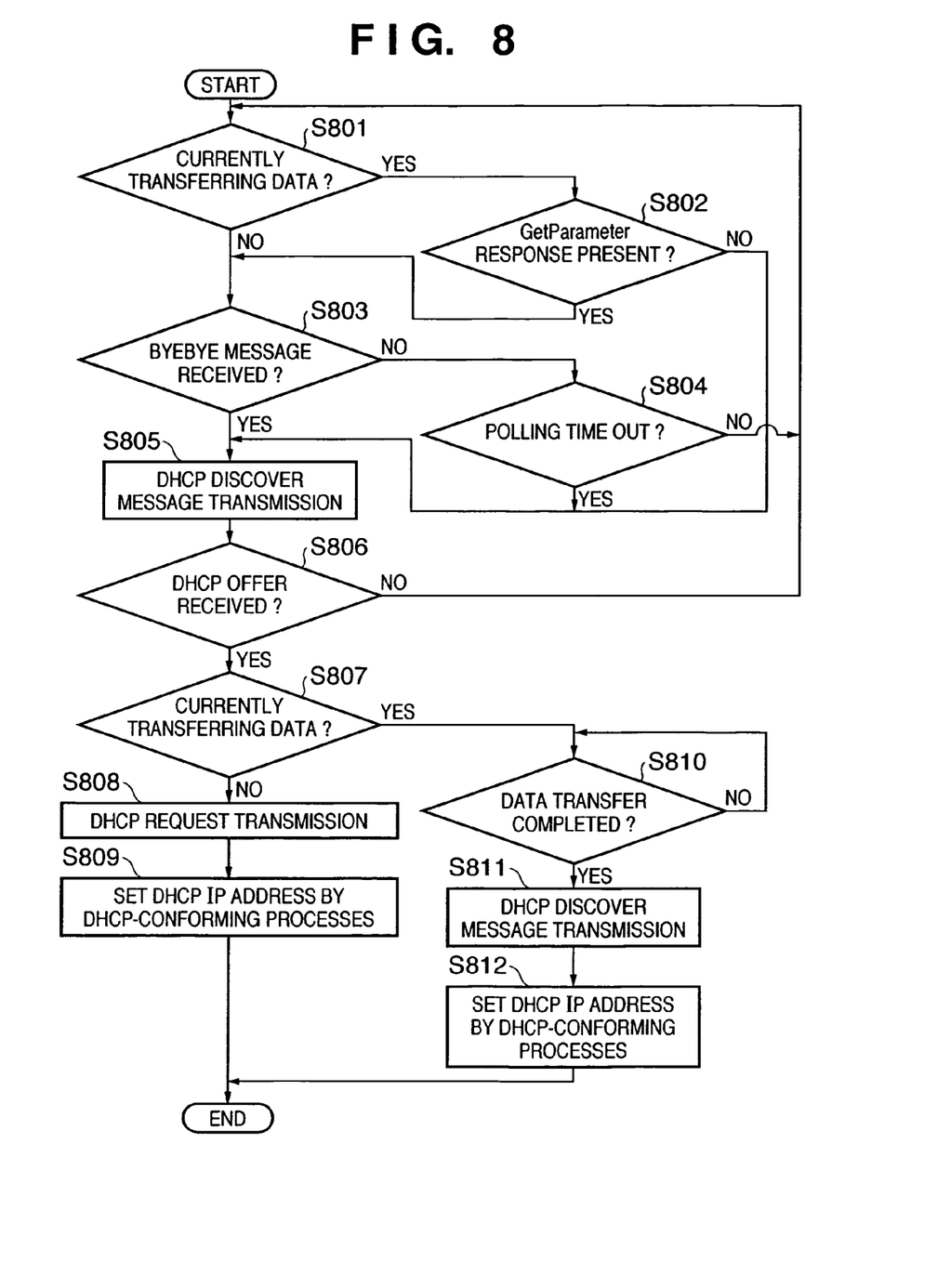
FIG. 8 is a flow chart showing a process according to the third embodiment of the present invention, carried out during a DHCP server search and when the DHCP server joins a network, in a device using AutoIP.

With reference to the flow chart shown in FIG. 8, a description is given below of a process carried out when a DVCR using AutoIP queries whether or not a DHCP server has subscribed to the network and a DHCP server has so subscribed.

Each UPnP device, when AutoIP setting is in effect, transmits a DHCP DISCOVER message every 5 minutes and conducts a periodic search for a DHCP server. In a step S801, when the DVCR is in a state of connection to another device, in other words when the DVCR is transferring data, processing proceeds to a step S802, where, in order to determine whether or not data transfer is being carried out normally, it is confirmed that there has been a response from the transmission counterparty during data transfer. In the present example, a RTSP GetParameter command is periodically transmitted to the counterparty and the determination is made whether data transfer is being carried out normally based on the presence or absence of a response therefrom.

In a step S802, if there is no response to the RTSP GetParameter command, that is, if data transfer is interrupted and the connection cut, then processing proceeds to a step S805 and a DHCP DISCOVER message is broadcast. This operation is a process predicated on the possibility that the data transfer counterparty has detected the appearance of the DHCP server before the DVCR has done so, and severed the connection by changing from AutoIP to the IP address provided by the DHCP server.

By contrast, if in the step S801 the DVCR is not in connection with another device, that is, is not transferring data, and in step S802 receives a response to the RTSP GetParameter command, then processing proceeds to a step S803. In step S803, a process in which a DHCP DISCOVER message is broadcasted is performed depending on whether or not a BYEBYE message has been received from a device on the network. This operation is a process predicated on the possibility that a device other than the DVCR itself has detected the appearance of the DHCP server before the DVCR has done so and multicast a BYEBYE message when changing IP address. Even if no BYEBYE message is received in step S803, when the 5-minute polling cycle for searching for the DHCP server elapses in a step S804 the DVCR broadcasts a DHCP DISCOVER message in the step S805. Thus, the DVCR executes a DHCP server search depending on the three types of conditions of steps S802, S803 and S804.

Next, in a step S806, it is determined whether or not a DHCP OFFER message from the DHCP server in response to the DHCP DISCOVER message issued in step S805 has been received. If a DHCP OFFER message has not been received, then processing returns to step S801, where the AutoIP is maintained. However, if in step S806 a DHCP OFFER message from the DHCP server has been received, then processing proceeds to a step S807, where the DVCR checks its own state of connection. Where the DVCR is not connected to another device on the network, in other words, where the DVCR is neither transmitting nor receiving data, then in a step S808 the DVCR transmits a DHCP REQUEST message requesting permission to use the IP address proffered by the DHCP OFFER message. Thereafter, the usual DHCP-conforming processes is carried out and the IP address allocated from the DHCP server by reception of the DHCP ACK message is set (step S809).

In step S807, if it is determined that the DVCR is in a state of connection with another device on the network, that is, if the, DVCR is transmitting or receiving data, then processing proceeds to a step S810, where the end of data transmission or reception is awaited. In step S810, if the connection is cut, in other words if data transmission or reception is finished, then in a step S811 the DVCR once again transmits a DHCP DISCOVER message. Thereafter, the usual DHCP-conforming processes is carried out and the IP address allocated from the DHCP server is set by reception of the DHCP OFFER message, transmission of the DHCP REQUEST message and reception of the DHCP ACK message (step S812).

Variations

It should be noted that, although in the first through third embodiments described above, in the steps S210, S510 and S810, the IP address does not change until data transfer is finished, the present invention is not limited to such an arrangement. For example, the AutoIP may be continued where a connection is established even though data is not actually being transferred, or a predetermined time out time may be provided and the connection severed when the predetermined time out time has elapsed even if data is being transferred and a DHCP DISCOVER message issued. Such a predetermined time out time may be 30 seconds, for example, or it may be the DHCP server search polling time out time (5 minutes in the present embodiment), or it may be the same as the UPnP ALIVE message transmission cycle (30 minutes). In any case, once the predetermined time out has elapsed, the connection is severed and a DHCP DISCOVER message issued. In this case, if the predetermined time out time is unlimited, the DHCP DISCOVER message is issued after data transfer is finished, as with the embodiments described above. Alternatively, in the data transfer in step S207, step S510 and step S810, detection of data transfer interruption may be carried out as described with respect to steps S502 and S802 in the second and third embodiments, such that, where data transfer is interrupted, the address may be acquired from the address server (that is, a DHCP DISCOVER message may be issued).

Moreover, in the above-described embodiments, after data transfer is finished a DHCP DISCOVER message is issued and a DHCP server-issued address is re-acquired (steps S208, S209, S511, S512, S811 and S812). However, a "time limit for reception of a DHCP REQUEST message after a DHCP OFFER message" is usually set in the DHCP server, and a DHCP REQUEST message for using the IP address described in the DHCP OFFER can be received within that time period. Therefore, where the time from reception of DHCP OFFER message to confirmation of data transfer completion is measured and that time is within the above-described time limit range set in the DHCP server, the DHCP REQUEST message for use of the IP address described in the already received DHCP OFFER message may be issued without issuing the DHCP DISCOVER message. Of course, the DHCP DISCOVER message is issued if the time limit is exceeded.

In addition, depending on the application loaded into the DVCR or the like, there are those provided with the capability to hold a reservation for data transfer from an external device. For example, two DTVs are present on the network, and a request for data transfer issued by one of the DTVs held as a reservation while the other DTV is in the process of transferring data. In an electronic device equipped with such a reservation capability, in the determination as to whether or not data transfer is completed carried out in steps S207, S510 and S810, even though data transfer currently being executed is finished, the reserved data transfer may be executed if a data transfer reservation exists. In other words, where it is determined that there is a data transfer reservation, data transfer may be continued.

As described above, according to each of the embodiments, in a device whose IP address is set by AutoIP on a network, when it is detected that a DHCP server has subscribed to the network, the device ascertains its own state of connection, maintains the AutoIP if the device is in a state of connection to another device and switches to the DHCP server-provided IP address after awaiting the cutting of such connection. As a result, an interruption of data transfer, which might possibly occur in connection with the appearance of the DHCP server on the network, can be prevented.

Moreover, according to the second embodiment, in addition to a periodic DHCP server search, a DHCP DISCOVER message is issued to the DHCP server where data transfer is interrupted (in the second embodiment, determined by whether or not a response packet to an RTSP GetParameter packet has been received) or a message (for example, an ALIVE message of IGD) is received indicating the possibility that a DHCP server has subscribed to the network. Moreover, in the third embodiment, where a message (for example, a BYEBYE message) is received indicating the possibility that the IP address of another electronic device on the network has changed (in other words, the possibility that a DHCP server has joined the network), a DHCP DISCOVER message is issued to the DHCP server. Thus, according to the second and third embodiments of the present invention, it is possible to detect the subscription to the network of a DHCP server more quickly than the normal DHCP server search polling cycle, and a communication-disabled time period caused by differences in the times at which devices on the network detect the separation of the DHCP server from the network can be minimized.

Other Embodiments

The objects of the present invention can be achieved by supplying a storage medium storing a software program that implements the functions of the foregoing embodiments to a system or apparatus, reading the supplied program code stored on the storage medium with a computer (or CPU or MPU) of the system or apparatus, and then executing the program code. In this case, since the program code read from the storage medium itself implements the functions of the above-described embodiment, the program code itself as well as the storage medium on which the program code is stored comprise the invention.

As many apparently widely different embodiments of the present invention can be made without departing from the scope and spirit thereof, it is to be understood that the invention is not limited to the specific embodiments thereof except as defined in the appended claims.

Claim of Priority

This application claims priority from Japanese Patent Application No. 2004-024731 filed on Jan. 30, 2004, which is hereby incorporated by reference herein.

What is claimed is:

1. An electronic device comprising:
a network interface unit that connects to a Universal Plug and Play (UPnP) network; and
a processor that
(a) determines whether or not the electronic device receives a BYEBYE message from the UPnP network,
(b) controls the electronic device to transmit a predetermined message for detecting an address server,
(c) determines whether or not a response of the predetermined message is received from the address server,
(d) determines whether or not the electronic device is performing transfer of data to an external device if the response of the predetermined message is received from the address server, (e) controls the electronic device not to change a first network address generated in the electronic device to a second network address assigned by the address server while the transfer of the data is being performed if the electronic device is performing transfer of the data to the external device when the response of the predetermined message is received from the address server, (f) changes the first network address generated in the electronic device to the second network address assigned by the address server after the transfer of the data ends if the electronic device is performing transfer of the data to the external device when the response of the predetermined message is received from the address server, and (g) changes the first network address generated in the electronic device to the second network address assigned by the address server if the electronic device is not performing the transfer of the data to the external device when the response of the predetermined message is received from the address server.

2. The electronic device according to claim 1, wherein the electronic device periodically transmits the predetermined message so as to detect the address server.

3. The electronic device according to claim 1, wherein the electronic device transmits the predetermined message if the transfer of the data being executed by the electronic device is interrupted.

4. The electronic device according to claim 1, wherein the electronic device includes a camera unit.

5. The electronic device according to claim 1, wherein the address server is a dynamic host configuration protocol (DHCP) server.

6. A method of controlling an electronic device including a network interface unit that connects to a Universal Plug and Play (UPnP) network, the method comprising the steps of:

determining whether or not the electronic device receives a BYEBYE message from the UPnP network;

controlling the electronic device to transmit a predetermined message for detecting an address server;

determining whether or not a response of the predetermined message is received from the address server;

determining whether or not the electronic device is performing transfer of data to an external device if the response of the predetermined message is received from the address server;

controlling the electronic device not to change a first network address generated in the electronic device to a second network address assigned by the address server while the transfer of the data is being performed if the electronic device is performing transfer of the data to the external device when the response of the predetermined message is received from the address server;

changing the first network address generated in the electronic device to the second network address assigned by the address server after the transfer of the data ends if the electronic device is performing transfer of the data to the external device when the response of the predetermined message is received from the address server; and changing the first network address generated in the electronic device to the second network address assigned by the address server if the electronic device is not performing the transfer of the data to the external device when the response of the predetermined message is received from the address server.

7. The method according to claim 6, wherein the predetermined message is periodically transmitted so as to detect the address server.

8. The method according to claim 6, wherein the predetermined message is transmitted if the transfer of the data being executed by the electronic device is interrupted.

9. The method according to claim 6, wherein the electronic device includes a camera unit.

10. The method according to claim 6, wherein the address server is a dynamic host configuration protocol (DHCP) server.

11. A non-transitory computer-readable storage medium storing a control program for causing a computer to execute the method according to claim 6.

* * * * *